Feb. 21, 1961 M. E. WALBERG 2,972,385
FOLDING IMPLEMENT FRAME
Filed Oct. 22, 1958 2 Sheets-Sheet 1

Inventor
Maynard E. Walberg
by Howard B. Schechman
Attorney

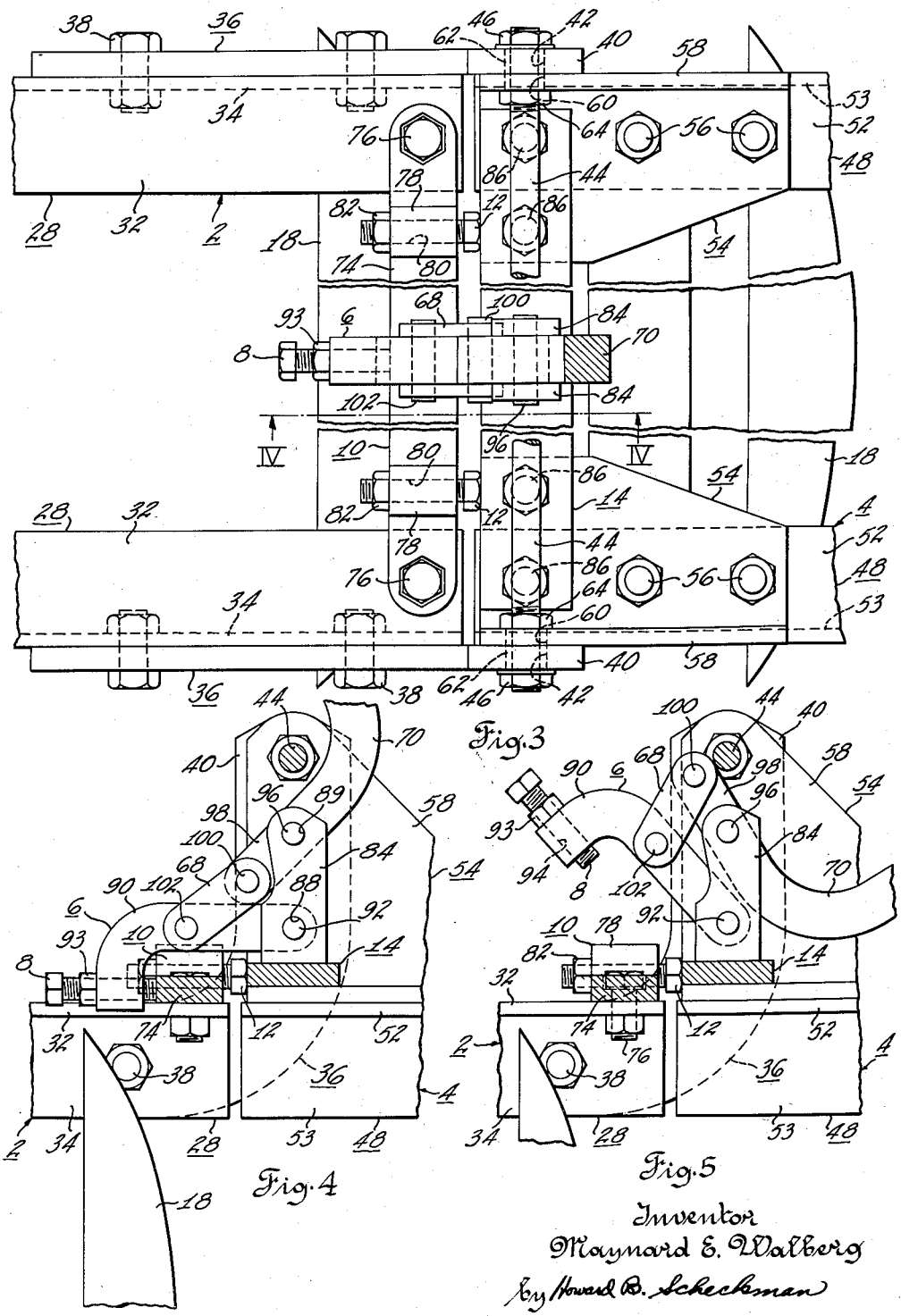

2,972,385

United States Patent Office

Patented Feb. 21, 1961

2,972,385

FOLDING IMPLEMENT FRAME

Maynard E. Walberg, West Salem, Wis., assignor to Allis-Chalmers Manufacturing Company, Milwaukee, Wis.

Filed Oct. 22, 1958, Ser. No. 768,980

8 Claims. (Cl. 172—568)

This invention relates to agricultural implements and more particularly to an improved folding frame construction for such implements.

As tractors become more powerful, they can move larger farm implements. However, as the width of the farm implement increases so does the difficulty in transporting and storing the implement. A solution to this problem is the folding implement frame. That is, an implement frame made in sections with the end sections being folded back onto a center section. Folding decreases the width of the frame. This permits the frame to pass where it normally could not, for example through narrow driveways, gates and into storage areas in buildings.

Folding implement frames are not new. (See for example U.S. Patents 1,089,927 and 1,308,938.) However, there are certain disadvantages in prior art folding implement frames.

One problem is that the folding end sections cannot be rigidly locked with respect to the center section, when the implement frame is in its working position. This is due to play between the parts. The play is caused by wear and manufacturing tolerances used in making the folding frame. As a result the end sections flutter relative to the center section and give erratic results in operation.

Another problem is that there is no provision for vertically adjusting the end sections of the implement frame, nor for locking the end sections in a vertically adjusted position. In a harrow, for example, there is a tendency for the outer disk blade to leave an undesirable ditch or furrow in the field. If the end sections could be adjusted with respect to the center section, to reduce the working depth of the outer disk blade, it would prevent gouging.

It is an object of the invention to provide a folding implement frame that can be rigidly locked in its working position regardless of wear between the elements of the frame and tolerances used in manufacturing the frame.

It is another object of the invention to provide a folding implement frame that has end sections which can be vertically or angularly adjusted relative to the center section and rigidly locked in their vertically adjusted position.

It is another object of the invention to provide a folding implement frame that has a simple locking arrangement to prevent the sections of the frame from accidentally unlocking.

Other objects and advantages will appear from the following description considered in conjunction with the attached drawings, in which:

Fig. 3 is a plan view of the pivotal connection between the center section and end sections of the implement, and also showing the arrangement for locking the sections together;

Fig. 4 is a side view of Fig. 3 taken in the direction of arrows IV—IV illustrating the latch bar engaging the first support, and the first support engaging the second support;

Fig. 5 is a view like Fig. 4 but with the latch bar in its release position.

Figure 6:
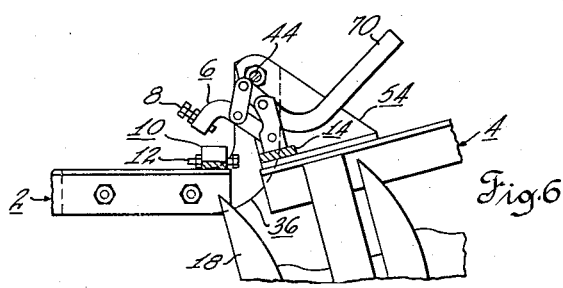
Fig. 6 is a view of the two sections of the frame separated prior to engagement.

This invention relates generally (Fig. 1) to an implement frame having a center section 2 and folding end sections 4. Each end section 4 is provided with a movable latch bar 6 (Figs. 5 and 6) having an adjustable abutment 8 which engages a first support 10 carried by center section 2 to securely lock sections 2 and 4 together. To provide for vertical adjustment, first support 10 is provided with adjustable stop means 12 to engage a second support 14 carried by end section 4. Stop means 12 vertically positions the end section with respect to center section 2. Adjustable abutment 8 cooperates with adjustable stop means 12 to releasably lock end and center sections 2, 4 in selected angular working positions.

The connection of each end section with the center section is a right and left hand duplicate. Therefore, only one of said connections, the right hand one, will be described.

Figure 1:
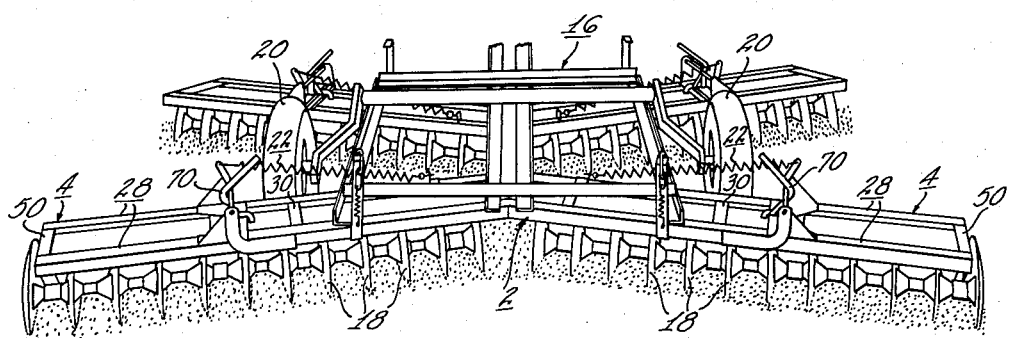
Fig. 1 is a view of a disk harrow employing the implement frame of this invention, the frame is shown with the end sections in working position and rigidly connected to the center section of the frame.

Referring more specifically to Fig. 1, the invention is shown as applied to a harrow 16. The harrow comprises an implement frame 2, 4 shown in its work engaging position with end sections 4 fully opened and locked in position; implements such as harrow disks 18 carried by implement frame 2, 4; transport wheels 20 to raise and lower disks 18 relative to the ground; and a spring arrangement 22 and hold-down 24 (which form no part of this invention but are separately claimed by my co-pending U.S. patent application 768,998) to aid in folding the end section and in holding it folded. End sections 4, 4 are pivotally connected to center section 2.

Figure 2:
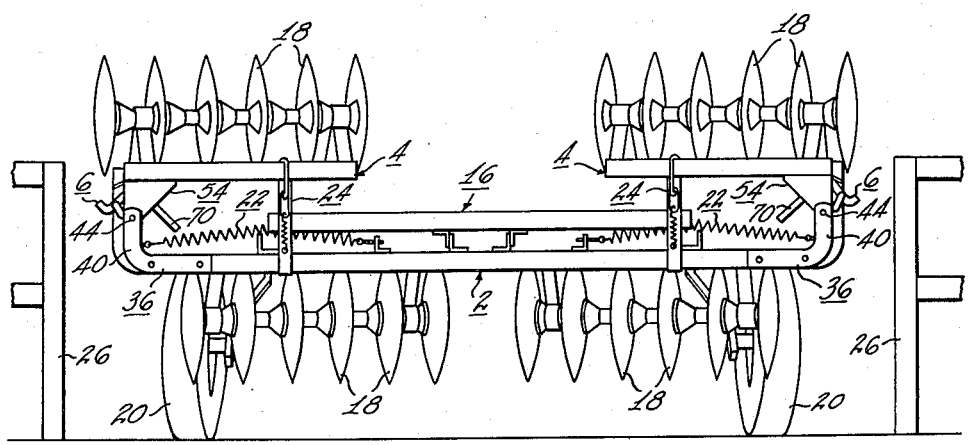
Fig. 2 is a view of the disk harrow of Fig. 1 passing through a gate, with the end sections of the frame folded back onto the center section and the disks raised to their transport position.

When it is desired to transport the harrow through a narrow opening as gate 26 for example (Fig. 2) transport wheels 20 are lowered and end sections 4 are folded back on to center section 2.

Referring to Figs. 3 through 6 generally, center section 2 comprises two spaced, parallel, inverted L-shaped members 28 that are joined by cross braces 30 (Fig. 1). Each member 28 has an upper flange 32 (Fig. 3) and an outer flange 34. Each outer flange 34 has a bracket 36 rigidly secured, as by bolts 38, to it. Each bracket 36 has an end 40 (Figs. 2, 4 and 5) which is curved upwardly and contains an opening 42 (Fig. 3). Openings 42 are aligned and receive horizontal pivot rod 44. Rod 44 has its ends threaded and extends outwardly beyond brackets 36, 36 to receive end nuts 46.

End section 4 also comprises two spaced, parallel, inverted L-shaped members 48 that are joined by braces 50 (Fig. 1). Each member 48 has an upper flange 52 (Fig. 3) and an outer flange 53. Mounted on the top surface of each upper flange 52 is an angle bracket 54. Angle brackets 54, 54 are spaced apart and rigidly secured by bolts 56, to the top of members 4. Each angle bracket 54 has a vertical portion 58 which is provided with an opening 60. Openings 60 align with openings 42 in brackets 36, 36 and also receive pivot rod 44. The axis of pivot rod 44 is spaced vertically above members 28 and 48.

Bearings 62 are provided in openings 42, 60 to facilitate pivoting between sections 2 and 4. The bearings are held in position by end nuts 46 and intermediate nuts 64 also threaded on pivot rod 44. Nuts 64 also function to permit adjustment of the pivot connection so as to prevent binding.

When end sections 4 are in the working position (Figs. 1 and 3), angle brackets 54, 54 fit within curved brackets 36, 36. This strengthens the connection and makes it better able to transmit the draft forces.

The frame includes a releasable locking arrangement to lock the end sections in position relative to the center section. The locking arrangement comprises (Fig. 5): a first support 10, including stop means 12; second support 14, latch bar 6, abutment 8, links 68, and actuating lever 70.

First support 10 comprises a brace 74 and stop means in the form of bolts 12. Brace 74 is rigidly secured, as by bolts 76, to the upper surfaces of members 28, 28 of center section 2. Brace 74 (Fig. 3) is provided with two spaced apart bosses 78. The bosses have means in the form of threaded horizontal openings 80 to adjustably receive stop means 12.

Stop means 12 determine the relative vertical or angular position of sections 2 and 4. Stop means 12 are mounted so that their heads are on the outside of brace 74 and face toward end section 4. The stop means are adjusted so their heads contact the inner edge of the second support 14 to vertically position end section 4 relative to center section 2. The adjusted position of stop means 12 is maintained by means of lock nuts 82.

Second support 14 includes a mounting member in the form of ears 84. Support 14 is rigidly secured as by bolts 86 to members 54 and 48 of the end section. Ears 84 are fixed to the central portion of support 14 and are spaced apart and upwardly projecting. Ears 84 (Fig. 4) are provided with two vertically spaced and horizontally aligned openings 88, 89.

Latch bar 6 comprises an arm 90 and abutment 8. Means in the form of pivot 92 movably connects latch bar 6 to said second support. The latch bar is mounted between ears 84 so it can pivot about the axis of pivot 92 which is received in lower openings 88 in the ears. Latch bar 6 projects inwardly toward center section 2. The free end of the latch bar is bent downwardly so as to overlie first support 10. This free end of the latch bar is provided with means in the form of a threaded opening 94 to adjustably receive an abutment 8 in the form of a bolt. Abutment 8 is adjusted so that its end contacts the inner edge of first support 10, when first support 10 and second support 14 engage and are in working position (Figs. 3 and 4). The adjusted position of abutment 8 is maintained by lock nut 93.

Means in the form of an actuating lever 70 and link 68 are provided to move latch bar 6 to a position (Fig. 4) adjacent first support 10. Actuating lever 70 is pivotally mounted between ears 84 by means of pivot 96. Pivot 96 is located in upper opening 89 of the ears. End 98 of actuating lever 70 projects beyond pivot 96. This end portion is pivotally connected to the midportion of latch bar 6 by means of links 68 and pivots 100 and 102.

Actuating lever 70 and links 68 move latch bar 6. Lever 70 and links 68 also cooperate to form a toggle interlock linkage arrangement that holds latch bar 6 in its position adjacent the first support.

Referring to Fig. 4 actuating lever 70 is shown in its latching position. In this position pivot point 100 has moved to the right, past dead center. Ears 84 are recessed so end 98 is not blocked from moving. End 98 engages the top surface of latch bar 6. This limits clockwise or opening movement of latch bar 6 since end 98 abuts the latch bar and prevents movement. Link 68 functions to maintain the lever in engagement with the latch bar. When lever 70 is rotated clockwise to open the latch bar, however, link 68 is moved from over the dead center position to a position in which it raises the latch bar (Fig. 5).

*Operation*

Assuming the position of end section 4 of implement frame 2, 4 is to be adjusted. First, stop means 12 carried on the front side of brace 74 are adjusted so that they will engage second support 14 to position end section 4 at a desired vertical position. Lock nuts 82 are then tightened.

Actuating lever 70 is then rotated counterclockwise (from Fig. 5 to Fig. 4) to move arm 90 and its abutment 8 into engagement with the back side of first support 10. Abutment 8 is adjusted to take out any play between the abutment and first support 10 when first and second supports 10, 14 are in engaged position. This is so the abutment will firmly engage first support 10 and lock it against second support 14. Lock nut 93 is then tightened.

When actuating lever 70 has moved to the position shown in Fig. 4, end 98 of the lever moves pivot 100 past dead center and engages arm 90. This locks the latch bar in its engaged position until the actuating lever is rotated clockwise to release the latch bar from its engaged position.

Abutment 8 and stop means 12 cooperate to form a three point contact arrangement between center section 2 and end sections 4 of the implement frame. This provides a rigid connection.

It is noted that abutment 8 and stop means are adjusted only once. Once set, their position is not changed unless it is desired to change the relative vertical or angular working position of the end sections, or to take up play that might occur between elements of the frame. It is further noted that although the invention is illustrated as used in a harrow, these teachings can be used with other implements, for example, cultivators can be made that use folding implement frames.

In summary:

This invention provides an implement frame which permits the end sections to be vertically or angularly adjusted relative to the center section; and rigidly locked in the adjusted position;

This invention also provides an implement frame which can be rigidly locked regardless of wear or manufacturing tolerances that provide play between elements of the frame; and Finally, this invention also provides a connection between the center and end sections that can be easily and quickly released so that the end section can be pivoted into raised or lowered position.

Although but a single embodiment of the present invention has been illustrated and described, it will be apparent to one skilled in the art that various changes and modifications may be made therein without departing from the invention as defined in the appended claims.

What is claimed is:

1. In a folding implement frame having two sections pivotally connected; an arrangement to releasably lock said two sections in selected angular working positions; comprising: a first support carried by one of said sections; said first support including movable stop means; a second support carried by the other of said sections; said second support positioned to engage said movable stop means of said first support when said sections are in working position; said second support and stop means cooperating to prevent relative movement between said two sections in a first direction; said stop means being movable relative to said first support to adjust the position of said second support relative to said first support to change the relative angular working position of said two sections; a movable arm carried by said second support; means connected to said arm to provide positive movement of said arm either to or from a position adjacent said first support when said second support engages said stop means; an abutment carried by said arm to engage said first support; means adjustably connecting said abutment to said arm, said abutment being adjustable relative to said arm to engage said first support to compensate for any relative movement that occurs between said first and second supports when said stop means adjusts the position of said second support relative to said first support; said abutment being positioned to prevent relative movement between said two sections in a direction opposite to said first direction; and, said arm when moved from said position adjacent said first support, unlocking said two sections so they can be folded.

2. In a folding implement frame, the combination comprising: two sections pivotally connected; a first support carried by one of said sections; a second support carried by the other of said sections; said second support positioned to engage said first support when said sections are in working position, said supports preventing relative movement between said two sections in a first direction; a movable arm pivotally carried by said second support; a lever pivotally connected intermediate its ends to said second support; means pivotally connecting one end of said lever to said arm, said lever providing positive movement of said arm toward said first support to a position adjacent said first support when said sections are in said working position, and away from said first support; an abutment carried by said arm to engage said first support; and, means adjustably connecting said abutment to said arm, said abutment being adjustable relative to said arm to engage said first support to compensate for any play that occurs between said abutment and said first support when said first and second supports are in working position; said abutment when adjusted relative to said arm to compensate for play, retaining said adjusted position relative to said arm, when moved by said means that moves said arm; said abutment preventing relative movement between said two sections in a direction opposite said first direction.

3. In a folding implement frame, the combination comprising: two sections pivotally connected; a first support carried by one of said sections; a second support carried by the other of said sections; said second support positioned to engage said first support when said sections are in working position, said supports preventing relative movement between said two sections in a first direction; said first support including a brace and movable stop means carried by said brace, said second support engaging said stop means when said supports are in engaged position; means adjustably connecting said stop means to said brace, said stop means being adjustable to vary the relative angular position between said two sections when they are engaged; a movable arm carried by said second support, means connected to said arm to move said arm, said means including an interlock to hold said arm in a position adjacent said brace when said two sections are in working position; an abutment carried by said arm to engage said brace; and, means adjustably connecting said abutment to said arm, said abutment being adjustable to compensate for any play that occurs between said abutment and said brace when said stop means and said second support are in engaged position, said abutment preventing relative movement between said two sections in a direction opposite said first direction.

4. A device as set forth in claim 3 wherein said means to move said arm includes a lever pivotally connected intermediate its ends to said second support, one end of said lever movable to a position engaging said arm when said arm has been moved to said position adjacent said first support; and, a link interconnecting said one end of said lever and the intermediate portion of said arm, said link cooperating with said lever to maintain said one end of said lever in engagement with said arm.

5. In a harrow of the type having a folding implement frame for supporting disk blades, the improvement comprising: two sections pivotally connected; a brace carried by one of said sections; spaced members carried on one side of said brace; means adjustably connecting said spaced members to said brace; a support carried by the other of said sections; said support positioned to engage said spaced members when said two sections are in working position to prevent relative movement between said two sections in a first direction; said spaced members being adjustable to vary the relative angular position between said two sections when they engage; a movable arm carried by said support; a lever to move said arm pivotally connected intermediate its ends to said support, a link interconnecting one end of said lever and the intermediate portion of said arm, said one end of said lever movable to a position engaging said arm when said sections are in working position; said link moved by said lever to form an interlock that maintains said one end of said lever in engagement with said arm; an abutment carried by said arm and positioned to engage said brace at a point between said two members and on the opposite side of said brace; and, means adjustably connecting said abutment to said arm, said abutment being adjustable to compensate for any play that occurs between said abutment and said brace when said spaced members and support are in engaged position, said abutment preventing relative movement between said two sections in a direction opposite to said first direction.

6. In a folded implement frame, the combination comprising: two sections pivotally connected; a first support carried by one of said sections; a second support carried by the other of said sections; said second support positioned to engage said first support when said sections are in working position, said supports preventing relative movement between said two sections in a first direction; a movable arm carried by said second support; means including an interlocking lever and link arrangement connected to said arm to move said arm toward said first support and hold said arm in a position adjacent said first support when said sections are in working position, said lever pivotally connected intermediate its ends to said second support, one end of said lever movable to a position engaging said arm when said arm has moved to said position adjacent said first support, said link interconnecting said one end of said lever and the intermediate portion of said arm, said link cooperating with said lever to maintain said one end of said lever in engagement with said arm; an abutment carried by said arm to engage said first support; and, means adjustably connecting said abutment to said arm, said abutment being adjustable to engage said first support to compensate for any play that occurs between said abutment and said first support when said first and second supports are in working position, said abutment preventing relative movement between said two sections in a direction opposite to said first direction.

7. In a folding implement frame, the combination comprising: two sections pivotally connected; a first support carried by one of said sections; a second support carried by the other of said sections; said first support including a brace which carries movable stop means, said stop means comprising two spaced members; said second support positioned to engage said stop means when said sections are in working position, said stop means being movable to vary the relative angular position between said two sections when they are in working position, said stop means preventing relative movement between said two sections in a first direction; a movable arm carried by said second support; means connected to said arm to move said arm toward said first support to a position adjacent said first support when said sections are in working position; an abutment carried by said arm to engage said brace of said first support; and, means adjustably connecting said abutment to said arm; said abutment being adjustable to engage said brace to compensate for any play that occurs between said abutment and said brace when said first and second supports are in working position, said abutment engaging said brace at a point spaced between said two spaced members, to prevent relative movement between said two sections in a direction opposite said first direction.

8. In a folding implement frame, the combination comprising: two sections pivotally connected; a first support carried by one of said sections; a second support carried by the other of said section; said first support positioned to engage said second support when said sections are in working position, said supports preventing relative movement between said two sections in a first direction; a movable arm carried by said second support; an abutment carried by said arm; and, means including an interlocking lever and link arrangement connected to said arm to clamp said abutment against or move it away from said first support when said first and second supports engage each other, said lever pivotally connected intermediate its ends to said second support, one end of said lever movable to a position engaging said arm when said abutment has been moved to said position against said first support, said link interconnecting one end of said lever and the intermediate portion of said arm, said link cooperating with said lever to maintain said one end of said lever in engagement with said arm; said interlocking arrangement holding said abutment in its clamped position against said second support to prevent relative movement between said two sections in a direction opposite to said first direction.

References Cited in the file of this patent
UNITED STATES PATENTS

| 236,531 | Barton | Jan. 11, 1881 |
| 662,605 | Smith | Nov. 27, 1900 |
| 1,072,863 | Lee | Sept. 9, 1913 |
| 1,267,762 | Graham | May 28, 1918 |
| 1,348,813 | Landine | Aug. 3, 1920 |
| 1,404,544 | Rettig | Jan. 24, 1922 |
| 2,306,127 | Johnston et al. | Dec. 22, 1942 |
| 2,327,834 | White | Aug. 24, 1943 |
| 2,583,053 | Kestner et al. | Jan. 22, 1952 |
| 2,864,121 | Imber et al. | Dec. 16, 1958 |

FOREIGN PATENTS

| 629,817 | Great Britain | Sept. 28, 1949 |
| 663,792 | Great Britain | Dec. 27, 1951 |